Dec. 10, 1929.   H. DREGHORN   1,739,445
COMMUTATOR DYNAMO ELECTRIC MACHINE
Filed July 6, 1927
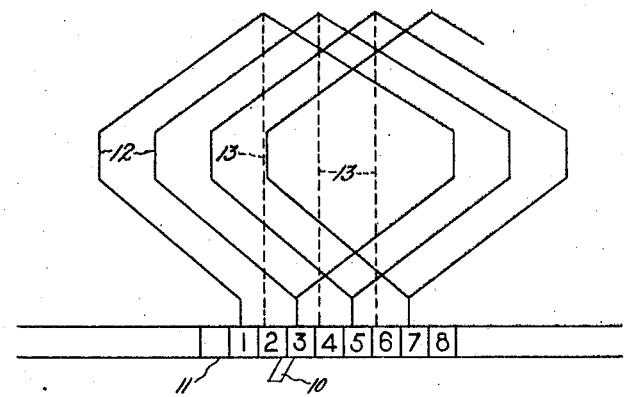
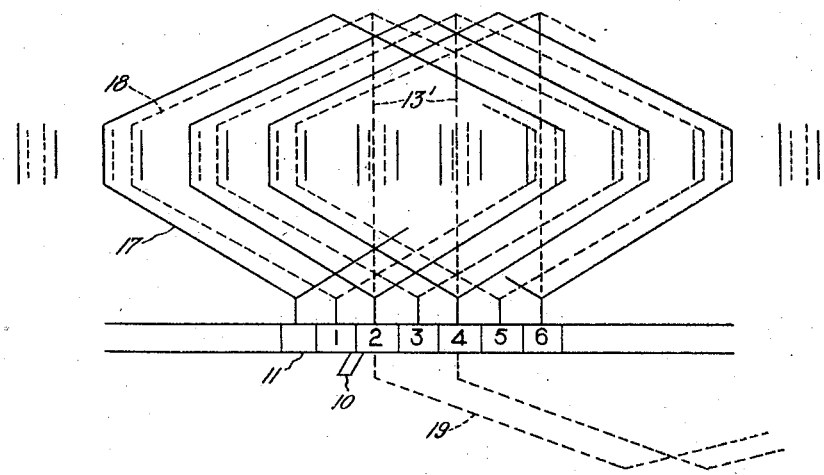
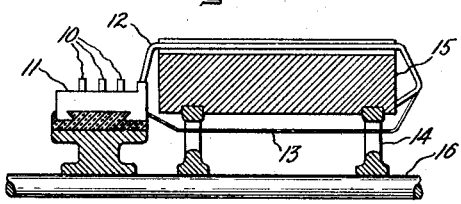
Inventor:
Herbert Dreghorn,
by
His Attorney.

Patented Dec. 10, 1929

1,739,445

UNITED STATES PATENT OFFICE

HERBERT DREGHORN, OF RUGBY, ENGLAND, ASSIGNOR TO GENERAL ELECTRIC COMPANY, A CORPORATION OF NEW YORK

COMMUTATOR DYNAMO-ELECTRIC MACHINE

Application filed July 6, 1927, Serial No. 203,821, and in Great Britain November 11, 1926.

My invention relates to dynamo electric machines of the commutator type and its object is to provide an armature construction which will materially reduce the voltage and improve the voltage gradient between adjacent commutator segments without reducing the voltage per armature coil with a view to improving commutation and increasing the allowable flux per pole.

In the usual single winding drum type armature construction, adjacent commutator segments are connected to opposite ends of a coil. In the double parallel winding armatures, alternate commutator segments are connected to the ends of a coil of one winding and the intermediate segments are connected to the other winding in the same way. In such constructions the voltage per coil must be kept within such limits as will reduce the voltage between commutator segments to a value where it can be successfully commutated without destructive sparking and the efficiency of the machine requires that the voltage gradient between segments shall be uniform. The voltage across the coil terminals of a single turn coil dynamo electric machine depends upon the coil pitch, the speed of rotation and the effective flux per pole. In order to reduce the size of the machine and utilize the iron efficiently the speed of rotation and the flux per pole should be kept as high as practicable. The voltage between adjacent commutator segments may be reduced by employing fractional pitch coils instead of full pitch coils. This has the disadvantages that the armature winding operates at reduced efficiency and the generation of undesirable harmonic currents is exaggerated.

Heretofore the efficient design of dynamo electric machines has been limited by the above considerations in order to keep the voltage between commutator segments within permissible commutating limits and this is particularly true with respect to alternating current commutator machines where the commutation difficulties are increased due to a transformer voltage existing between commutator segments.

It is the object of my invention to provide a commutator armature having a very uniform voltage gradient between commutator segments of a value that may be successfully commutated without destructive sparking while permitting full pitch coils and relatively high speeds and high flux per pole.

In carrying my invention into effect I provide connections from suitable points intermediate the ends of a coil to commutator segments located between those segments connected to the ends of the coil so as to uniformly distribute the coil voltage over more segments than heretofore. In an armature having parallel windings these intermediate connections may connect equal voltage points of the parallel windings together, thereby assuring a very uniform voltage gradient between segments.

The features of my invention which are believed to be novel and patentable will be pointed out in the claim appended hereto. For a better understanding of my invention reference is made in the following description to the accompanying drawings in which Fig. 1 represents the invention applied to an ordinary drum armature winding; Fig. 2 shows the invention applied to an armature having parallel windings, and Fig. 3 shows a cross-section through a portion of an armature to which my invention has been applied to show the preferred location of the special connections.

Referring to Fig. 1, 10 represents the brush, 11 the commutator, and 12 the coils of a multiple coil drum armature. The commutator has twice as many segments as there are coils. The first coil to the left has its ends connected to segments 1 and 3, the next coil has its ends connected to segments 3 and 5, and the next coil has its ends connected to segments 5 and 7, etc. Segments 2, 4, etc. are respectively connected by special connections 13 to the middle points of the armature coils. Thus segment 2 is connected to the middle point of the coil having its ends connected to the two adjacent segments 1 and 3. The middle points of these coils are on the opposite ends of the armature from the commutator. The special connections 12 may be carried through openings in the armature spider 14 between the armature core 15 and shaft 16, as represented in Fig. 3.

It is seen that the armature circuit between segments 1 and 3, etc. will link 100% of the flux per pole in the usual manner, but that the portion between segments 1 and 2 and between 2 and 3 will link 50% of the flux per pole, thus reducing the voltage between adjacent commutator segments by 50% and making this voltage gradient uniform. This permits full pitch coils to be used, thereby obtaining maximum efficiency and minimum harmonics with twice the normal flux per pole for the maximum permissible voltage between commutator segments. Thus, larger machines are possible without exceeding the permissible commutating voltage per segment. The invention is particularly advantageous in large alternating current commutator machines such as is described in U. S. Reissue Patent No. 14,031, Schrage, where a transformer voltage between commutator segments exists. The special connections 13 may also be carried through the armature slots which are located half way between the slots containing the corresponding coils. This would make the voltage between adjacent segments correspond to that produced by a coil of one-half the pitch of the actual coil employed. This arrangement would have a slight structural advantage but would have a greater tendency to develop fractional pitch coil harmonics and does not have a uniform potential gradient from segment to segment.

Fig. 2 shows the application of the invention to an armature winding comprising parallel winding groups. One group is indicated in full lines at 17 and the other group in dotted lines at 18. The coils of group 17 are connected to commutator segments 2, 4, 6, etc. and the coils of group 18 are connected to intermediate segments 1, 3, 5, etc. The full coil voltage thus exists between alternate segments. To insure a uniform voltage gradient between segments my special connections are employed between the middle point of one group of coils to the commutator segment located between the segments connected to the ends of such coils. Thus, the middle points of the coils in group 18 are connected by connectors 13′ to commutator segments 2, 4, 6, etc. These connections need only be of very small section, as very little current will intermittently flow in them, and there will be half as many of these connections as there are commutator segments since this is sufficient to insure a uniform voltage gradient between all the segments. Care should be taken to select the proper number and pitch of coils so as to avoid currents circulating in the local parallel circuits and Fig. 2 represents a correct selection. It will be noticed that all the coils are not exactly the same pitch, one group of coils 17 being pitched 5 slots and the other group 18 being pitched 6 slots so that theoretically equipotential points in the two groups are thus connected by conductors 13′. 19 represents ordinary equalizer connections and these may be located on the back of the armature if desired.

The invention may be applied to other forms of winding than those represented. In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is,—

An armature for dynamo electric machines comprising a slotted core, a pair of parallel winding groups in said slots, the coils in the two groups being of different pitch, a commutator having spaced segments connected to the coil ends of one of said windings and having intermediate spaced segments connected to the coil ends of the other of said windings, and connections between points midway between the coil ends of one of said windings to the commutator segments connected to the coil ends of the other winding, the before-mentioned difference in the coil pitch being such that said connections connect equal potential points in the two windings.

In witness whereof, I have hereunto set my hand this 15th day of June, 1927.

HERBERT DREGHORN.